US010657724B2

(12) United States Patent
Sourimant et al.

(10) Patent No.: US 10,657,724 B2
(45) Date of Patent: May 19, 2020

(54) KEY LIGHTS DIRECTION DETECTION

(71) Applicant: THOMSON Licensing, Issy-les-Moulineaux (FR)

(72) Inventors: Gael Sourimant, Chantepie (FR); Eric Hubert, Rennes (FR); Jean-Eudes Marvie, Betton (FR)

(73) Assignee: THOMSON Licensing, Cesson-Sevigne (FR)

( * ) Notice: Subject to any disclaimer, the term of this patent is extended or adjusted under 35 U.S.C. 154(b) by 79 days.

(21) Appl. No.: 16/064,439

(22) PCT Filed: Dec. 20, 2016

(86) PCT No.: PCT/EP2016/081945
§ 371 (c)(1),
(2) Date: Jun. 20, 2018

(87) PCT Pub. No.: WO2017/108806
PCT Pub. Date: Jun. 29, 2017

(65) Prior Publication Data
US 2018/0374271 A1    Dec. 27, 2018

(30) Foreign Application Priority Data
Dec. 21, 2015   (EP) .................................... 15307085

(51) Int. Cl.
| | |
|---|---|
| *G06T 19/00* | (2011.01) |
| *G06T 15/50* | (2011.01) |
| *G06T 7/73* | (2017.01) |
| *G06T 7/70* | (2017.01) |

(52) U.S. Cl.
CPC .............. *G06T 19/006* (2013.01); *G06T 7/70* (2017.01); *G06T 7/73* (2017.01); *G06T 15/50* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 8,406,561 B2 | 3/2013 | Hadap et al. | |
| 8,797,321 B1* | 8/2014 | Bertolami | G06T 15/50 345/426 |
| 9,330,500 B2* | 5/2016 | Karsch | G06T 19/006 |
| 9,449,428 B2* | 9/2016 | Gautron | G06T 15/50 |
| 9,524,585 B2* | 12/2016 | Steed | G06T 15/50 |
| 2008/0024523 A1* | 1/2008 | Tomite | G06T 15/50 345/632 |
| 2009/0110322 A1* | 4/2009 | Hadap | G06T 15/506 382/274 |
| 2009/0128552 A1* | 5/2009 | Fujiki | G06T 19/006 345/419 |

(Continued)

*Primary Examiner* — Jason A Pringle-Parker
(74) *Attorney, Agent, or Firm* — Vincent E. Duffy

(57) ABSTRACT

A method and apparatus for detecting a main lighting direction from the input image, which corresponds to a key light. The system is operative to nm on data-parallel architectures allows for incoming light direction estimation in real-time. More particularly, the method and apparatus detect a key, or principal light direction relative to the position/orientation of an acquisition device. It method involves image analysis to find a maximum intensity value, maximal values filtering, and conversion of the input image position to a direction in space.

11 Claims, 4 Drawing Sheets

(56) References Cited

U.S. PATENT DOCUMENTS

| | | | | |
|---|---|---|---|---|
| 2014/0132602 A1* | 5/2014 | Raghoebardayal | ...... | G06T 17/00 345/420 |
| 2014/0176535 A1* | 6/2014 | Krig | ........................ | G06T 15/04 345/419 |
| 2014/0267412 A1* | 9/2014 | Calian | .................... | G09G 5/377 345/633 |

* cited by examiner

KEY LIGHTS DIRECTION DETECTION

This application claims the benefit, under 35 U.S.C. § 365 of International Application PCT/EP2016/081945, filed Dec. 20, 2016, which was published in accordance with PCT Article 21(2) on Jun. 29, 2017, in English, and which claims the benefit of European Patent Application No. 15307085.9 filed Dec. 21, 2015.

BACKGROUND

Augmented reality is the process of mixing real input images (typically videos) and virtual 3D objects, in such a way that virtual 3D objects seem to belong to the real scene being shot. An important aspect of augmented reality is lighting of the virtual objects. In order for virtual 3D objects to appear seamlessly mixed in a real environment, they need to be positioned in accordance with the point of view of real camera, but they also need to be lit in a similar way to the real environment. This process is commonly referred to as relighting.

In order to address relighting of virtual 3D objects in accordance with a real environment, acquired in the form of images, one has to have some knowledge on the light sources positions in the real environment relatively to the virtual objects. It would be desirable to analyze an image, such as a photo or video stream, in real time to detect a main lighting direction from the input image, which corresponds to a key light in order to correctly light the virtual objects. As this process is performed in real time, it would be desirable to not rely on the assumption that a known object is viewed in the real scene and that it does not rely on the micro-surface properties of viewed real objects.

SUMMARY

A method and apparatus for detecting a main lighting direction from the input image, which corresponds to a key light. The system is operative to run on data-parallel architectures which allows for incoming light direction estimation in real-time. More particularly, the method and apparatus detect a key, or principal light direction relative to the position/orientation of an acquisition device. The method involves image analysis to find a maximum intensity value, maximal values filtering, and conversion of the input image position to a direction in space.

In accordance with an aspect of the present disclosure, an apparatus for a memory for storing an image wherein said image has a plurality of pixels and for storing a data indicating a location of a pixel, a first processor for determining a first plurality of pixel blocks within said image, for determining a second plurality of pixels blocks within said one of said first plurality of pixel blocks, and for generating virtual lighting in response to said data, and a second processor for determining one of said first plurality of pixel blocks having the highest luminance intensity and for determining said pixel within one of said second plurality of pixel blocks having a maximal intensity.

In accordance with another aspect of the present disclosure, a method for accessing an image wherein said image has a plurality of pixels, determining a first plurality of pixel blocks within said image, determining one of said first plurality of pixel blocks having the highest luminance intensity, determining a second plurality of pixels blocks within said one of said first plurality of pixel blocks, determining a pixel within one of said second plurality of pixel blocks having a maximal intensity, storing data indicating a location of said pixel, and generating virtual lighting in response to said data.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DETAILED DESCRIPTION OF THE PREFERRED EMBODIMENT

The exemplifications set out herein illustrate preferred embodiments of the invention, and such exemplifications are not to be construed as limiting the scope of the invention in any manner.

This method and system of the present disclosure is operative to detect a main lighting direction from the input image, which corresponds to a key light (here, key light means principal light). Running on data-parallel architectures allows for incoming light direction estimation in real-time. Estimation of light sources in an image of video can be performed by an analysis of shading of the viewed real objects. Shading refers here to the light quantity that is reflected off objects towards the viewer. To do so, these techniques either need to estimate the micro-surface orientation of real objects, or assume that a perfect sphere is viewed in the real environment. The constraint of adding a specific object in the real world to estimate light positions may be relieved by assuming a certain class of objects are viewed in the real scene, such as human faces. One may be able estimate multiple light source positions from a single image, assuming that a generic object is clearly identified in the image. This object is usually outlined manually by an operator.

Estimating light positions can be performed by searching for illumination maxima in the input images. A system may analyze adjacent patches of the input image and determines light positions by comparing intensity and gradient ratios between said patches. Alternatively, using punctual lighting estimation, the entire image may be analyzed at once, instead of a subset of punctual positions and/or directions. This method and system of the present disclosure detects a key (or principal) light direction relative to the position/orientation of an acquisition device. It can be decomposed into three main steps: image analysis to find a maximum intensity value, maximal values filtering, and conversion of the input image position to a direction in space.

Figure 1:
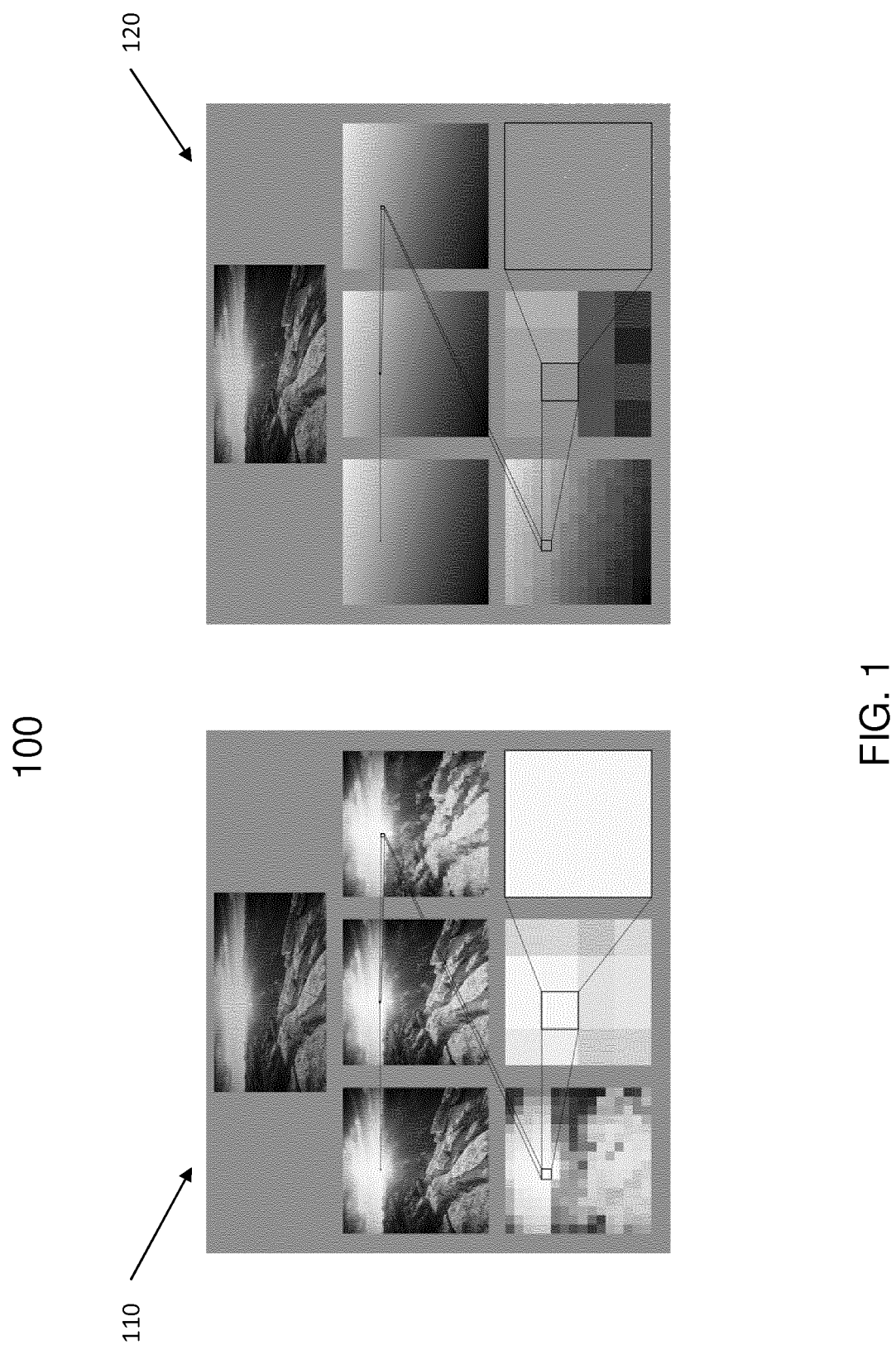
FIG. 1 shows an exemplary embodiment of an analysis for determining a key light direction is shown according to the present disclosure.

Turning now to FIG. 1 an exemplary embodiment of an analysis 100 for determining a key light direction is shown.

The analysis is performed through a constrained parallel reduction scheme. The technique starts with an input image, such as a frame from a live video stream. In one embodiment of the invention, this image can be first rescaled for easier processing in the latter stages. The first step consists in converting the input pixel color values to luminance intensities 110. The image of intensities are then sub-sampled in both spatial dimensions. A pixel in the sub-sampled image is associated to N pixels in the source image, depending on the sub-sampling factor. For example, if the sub-sampling factor is 2 in each dimension, one pixel in the sub-sampled image corresponds to four pixels in the source image.

In the sub-sampled image, each processed pixel stores a triplet of values composed of the maximal intensity read from the N input pixels of the source pixel that has this maximal intensity, together with the 2D coordinates which may be expressed in the source image space. This reduction process is repeated until the sub-sampled image contains only one pixel, which then stores the intensity and position in the source image of the pixel that has the maximal intensity. Since the source image may have a low dynamic, bright areas can be clipped and thus large zones of the image can have the same maximal pixel intensity. In such cases, when computing the sub-sampled images, there can be multiple source pixels that give the same maximal pixel intensity. The reduction may be constrained by choosing the maximal source pixel regarding its 2D coordinates in the image. In one embodiment, it may be chosen that priority will be given to pixels with the highest vertical pixel coordinate and the lowest horizontal pixel coordinate. Adding such constrain to the parallel reduction may result in a better light position estimation over time.

The present solution takes an input image and determine a sub-sampled image by grouping pixels of the input image in pixel blocks. A pixel of the input image, also called input pixel, is associated with a coordinates and a luminance value. The pixel blocks are processed in order to be associated with a coordinates and a luminance value. The present method determines which of the input pixels of the pixel block has the highest luminance value. In case of equality between several pixel luminance values, rules are applied to make a choice. The coordinates and luminance value of the input pixel with the highest luminance value are associated with the pixel block. This operation is done for at least one pixel block, up to for each pixel blocks. In case a pixel block is not processed, a coordinates and a luminance value are associated to it, for example by taking values of the top left input pixel of the pixel block or, for instance, by randomly selecting one input pixel of the block. Once the sub-sampled image has been processed, the method determines which of the pixel blocks of the sub-sampled image has the highest luminance. A way to perform this step is to iterate the former steps by considering the processed sub-sampled image as a new input image, to group its pixels into pixel blocks and, for at least one of these blocks, determining which of its input pixels is associated with the highest luminance value.

Searching image position of maximal intensity may alternatively be performed and stored as red/green values 120. Each pixel in the sub-sampled image correspond to the processing of the N corresponding pixels of the previous level, until an image containing a single pixel is reached. Successive sub-sampled images store both the maximal pixel intensity, shown as red/green values, from the parent N×N pixels and the 2D position of this maximal pixel.

Once the parallel reduction has been performed, in order to make the technique even more robust to variations over time the intensity-coordinates triplet may be stored and a filtering performed on the last K values determined with the luminance and coordinates being filtered separately. In one embodiment, the K last values may be filtered using a running average. In another embodiment, the median value of the K last value is kept.

Figure 2:
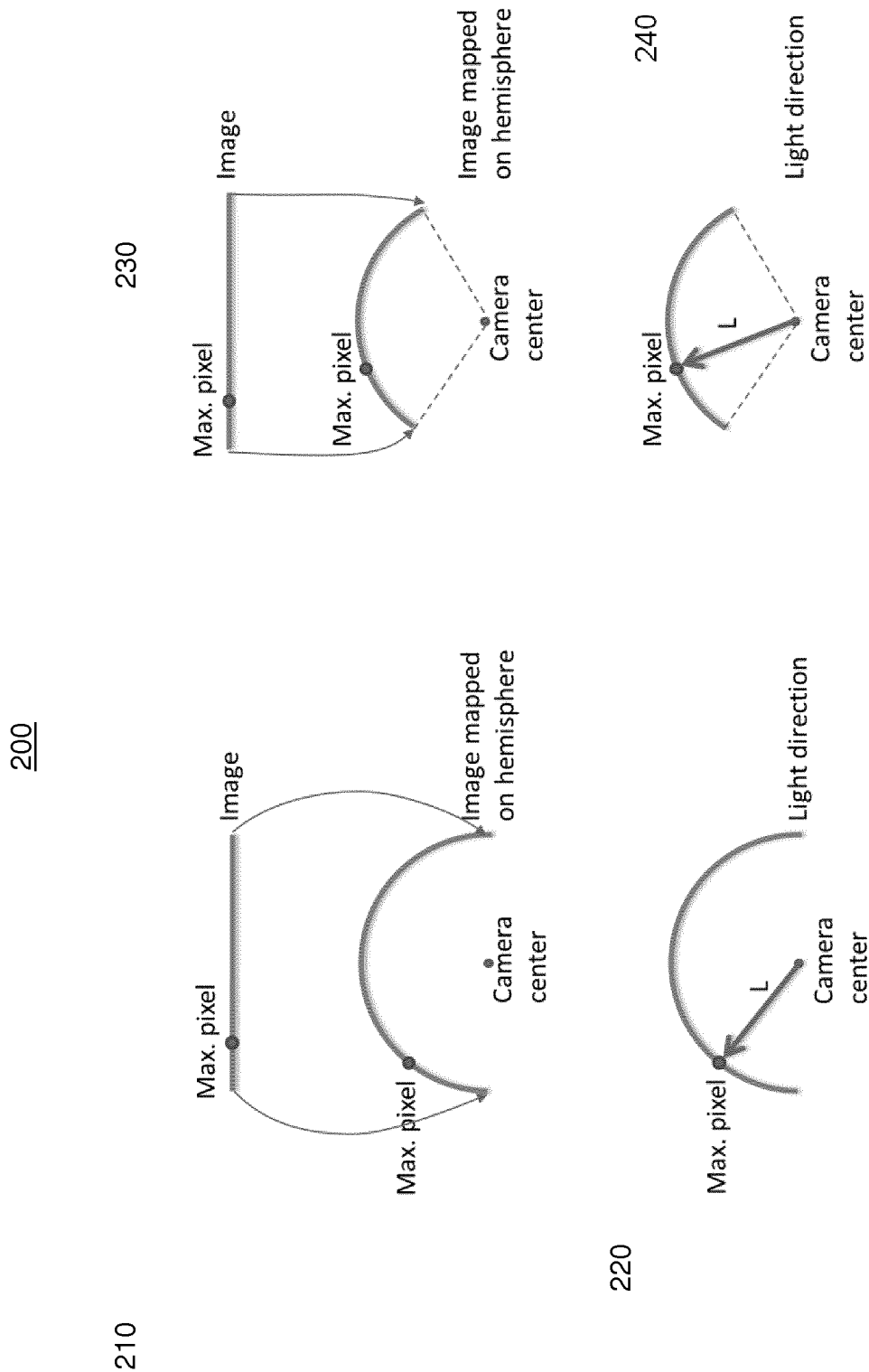
FIG. 2 shows a spherical parameterization of the input image and retrieval of a corresponding light direction, expressed in the camera space according to the present disclosure.

Turning now to FIG. 2, a spherical parameterization 200 of the input image and retrieval of a corresponding light direction, expressed in the camera space is shown. The input image is acquired by the camera. The field of view of the camera defines a portion of a sphere, centered on the camera, on which the input image can be projected. In this operation, the filtered luminance-coordinate values are interpreted to give the final light position estimation, together with the lighting direction and intensity. This part of the invention consists in choosing a parameterization that maps the input image to a 3D unit sphere portion, centered on the camera center. In one embodiment of the invention, the input image is mapped to a hemisphere 210. The maximum pixel intensity is then converted to spherical coordinates on the hemisphere at a unit direction L 220. In a second embodiment, the input image is mapped to a portion of the sphere regarding the input field of view of the camera 230. The 2D image coordinates of the pixel with the maximal luminance are thus converted into spherical coordinates using this parameterization 240. This gives, expressed in the space of the input camera, a unit direction L from which the light is emitted. By choosing an arbitrary light distance d, the light position can be computed in the camera space as d*L.

Figure 3:
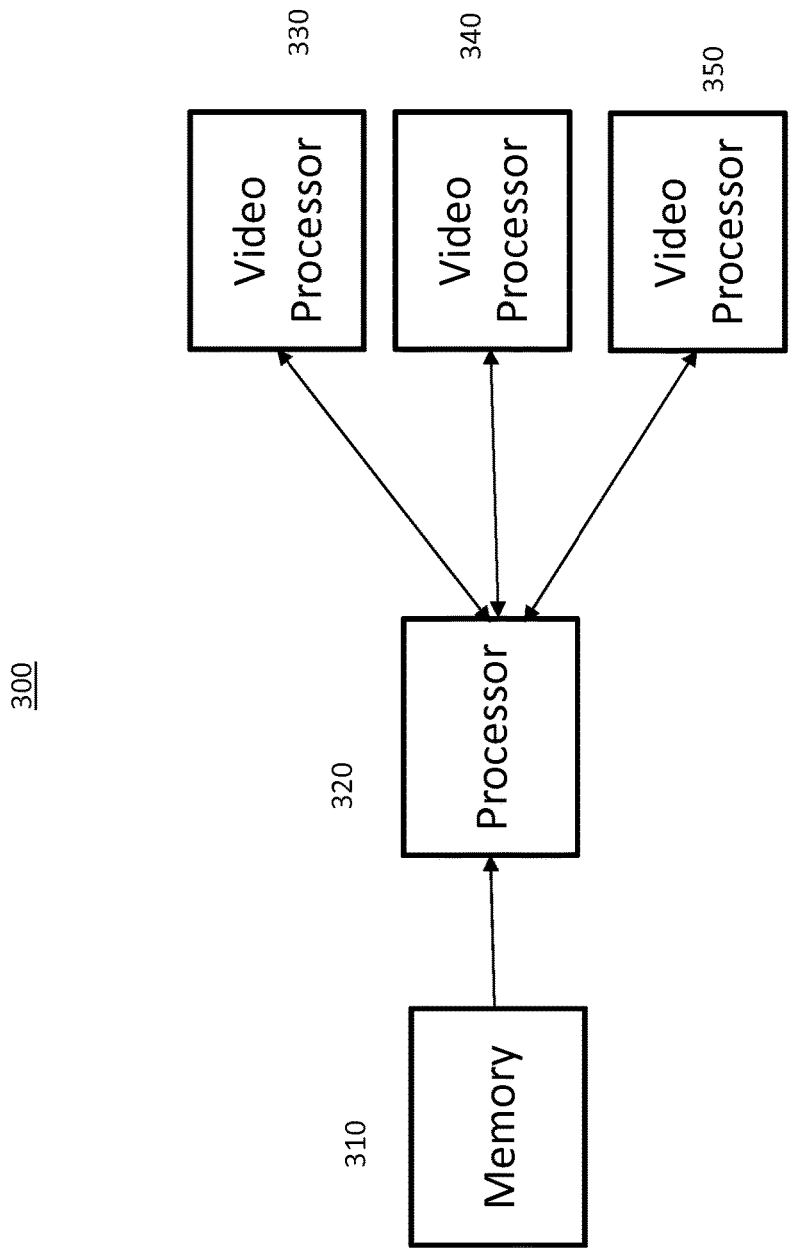
FIG. 3 shows a parallel processing architecture operative to execute the exemplary embodiments of the disclosed system.

Turning now to FIG. 3, a parallel processing architecture 300 operative to execute the exemplary embodiments of the disclosed system is shown. The system is operative to store an image in the memory 310. The processor is operative to convert the input pixel color values to luminance intensities. The image is divided into a plurality of subsampled images. Each subsampled image then processed by one of a plurality of video processors 330, 340, 350. The video processors are operative to determine the maximum luminance value is the subsampled image and return these values to the processor. The processor then further divides the image for parallel video processing until a single pixel is reached indicating the maximal intensity of the image.

Figure 4:
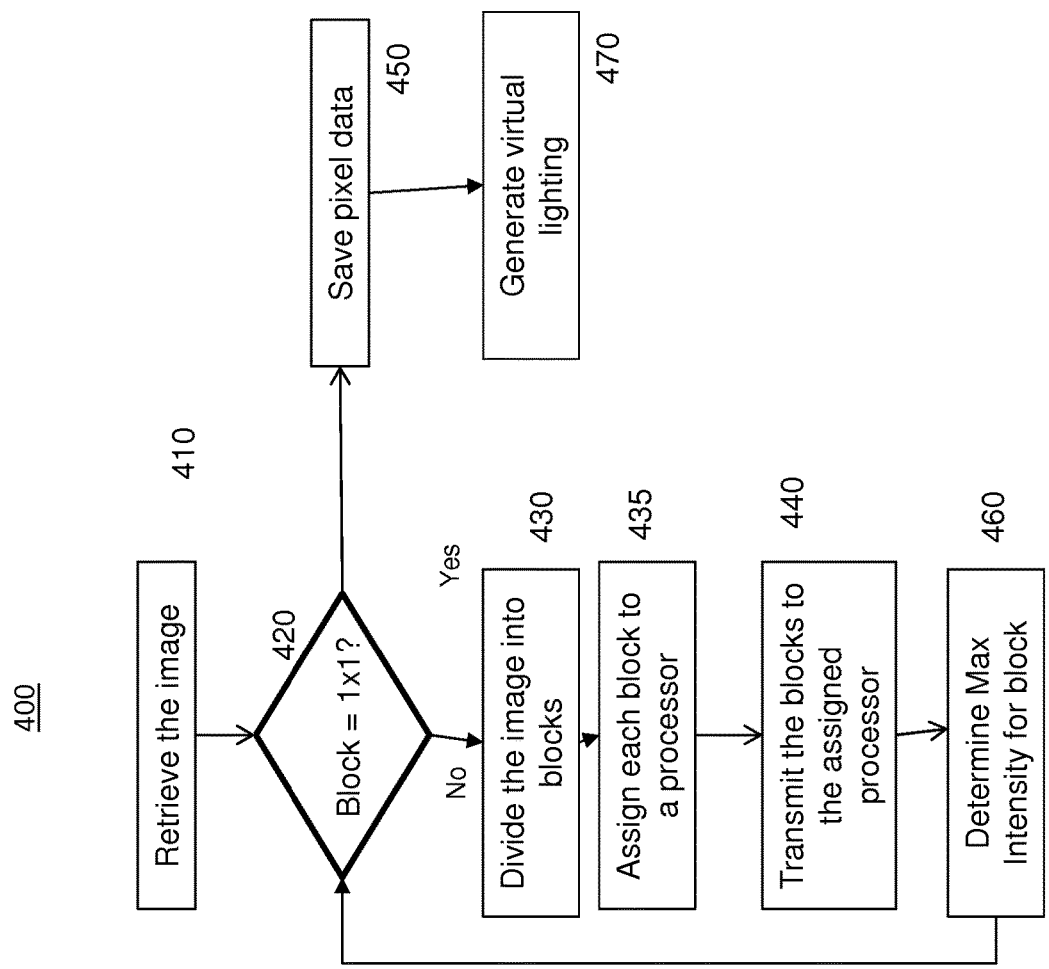
FIG. 4 shows an exemplary process for key lights direction detection according to the disclosed process is shown.

Turning now to FIG. 4, a method for performing an exemplary embodiment of the disclosed process is shown. The system is operative to retrieve the image from a memory 410. The system may receive the image as part of a video stream. The system is then operative to determine if the image is a one pixel by one pixel block 420, thereby indicating the pixel with the maximal intensity. If so, the pixel data is saved as an indicator on the maximal intensity of the image 450. If not, the system divides the image into blocks 430. Each block is assigned to a video processor 435. Each video processor analyzes the block to determine the maximal intensity within the block. The maximum intensity value is returned to the system. The block with the maximal intensity is then further divided into blocks 420. The processes are repeated until a block of one pixel by one pixel is determined with a maximal intensity for the entire image. This maximal intensity value can be used to generate virtual lighting 470 or can be used to place a virtual object within the image.

It should be understood that the elements shown and discussed above, may be implemented in various forms of hardware, software or combinations thereof. Preferably, these elements are implemented in a combination of hardware and software on one or more appropriately programmed general-purpose devices, which may include a processor, memory and input/output interfaces. The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that the block diagrams presented herewith represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The invention claimed is:

1. A method of generating virtual lighting for an object according to an input image captured by a camera, the method comprising:
   dividing the input image in blocks of pixels;
   for at least one block, determining a pixel of the block with a highest luminance and associating coordinates and luminance of the determined pixel with the block;
   determining a final block with a highest luminance by iterating:
   generating a new input image using said blocks associated with a luminance and coordinates as pixels of the new input image;
   dividing the new input image in second blocks; and
   for each second block, determining a pixel of said second block associated with a highest luminance and associating coordinates and luminance of the determined pixel with the second block until said new input image is a one-pixel image; and
   generating virtual lighting for said object from a main lighting source for which a main lighting direction is determined according to coordinates associated with said final block by mapping the input image on a portion of a sphere determined according to a field of view of the camera.

2. The method of claim 1 wherein said determining steps are performed in a parallel processing architecture.

3. The method of claim 1 wherein coordinates associated with said final block are mapped from said input image onto a position in a spherical representation of said input image centered on the camera.

4. The method of claim 3 wherein said main lighting direction is a vector from said position toward the camera.

5. The method of claim 1 wherein said virtual lighting is used to illuminate a virtual object added to said image.

6. An apparatus for generating virtual lighting for an object according to an input image captured by a camera, the apparatus comprising a memory associated with at least one processor configured to:
   divide the input image in blocks of pixels;
   for at least one block, determine pixel of the block with a highest luminance and associate coordinates and luminance of the determined pixel with the block;
   determine a final block with a highest luminance by iterating:
   generating a new input image using said blocks associated with a luminance and coordinates as pixels of the new input image;
   dividing the new input image in second blocks; and
   for each second block, determining a pixel of said second block associated with a highest luminance and associating coordinates and luminance of the determined pixel with the second block until said new input image is a one-pixel image; and
   generate virtual lighting for said object from a main lighting source for which a main lighting direction is determined according to coordinates associated with said final pixel block by mapping the input image on a portion of a sphere determined according to a field of view of the camera.

7. The apparatus of claim 6 wherein said at least one processor is configured to operate in a parallel processing architecture.

8. The apparatus of claim 6 wherein said at least one processor is further configured to map coordinates associated with said final block from said input image onto a position in a spherical representation of said input image centered on the camera.

9. The apparatus of claim 8 wherein said main lighting direction is a vector from said position toward the camera.

10. The apparatus of claim 6 wherein said at least one processor is further configured to illuminate a virtual object added to said image with said virtual lighting.

11. A non-transitory processor readable medium having stored program code instructions executable by a processor for implementing the steps of a method according to claim 1.

* * * * *